United States Patent
Chen et al.

(10) Patent No.: US 10,572,010 B2
(45) Date of Patent: Feb. 25, 2020

(54) ADAPTIVE PARALLAX ADJUSTMENT METHOD AND VIRTUAL REALITY DISPLAY DEVICE

(71) Applicants: BOE TECHNOLOGY GROUP CO., LTD., Beijing (CN); Beijing BOE Optoelectronics Technology Co., Ltd., Beijing (CN)

(72) Inventors: Yinwei Chen, Beijing (CN); Minglei Chu, Beijing (CN); Chenru Wang, Beijing (CN)

(73) Assignees: BOE TECHNOLOGY GROUP CO., LTD., Beijing (CN); BEIJING OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/028,716

(22) Filed: Jul. 6, 2018

(65) Prior Publication Data
US 2019/0121428 A1  Apr. 25, 2019

(30) Foreign Application Priority Data
Oct. 19, 2017  (CN) ............................ 2017 1 0976848

(51) Int. Cl.
*H04N 13/128*  (2018.01)
*G06F 3/01*  (2006.01)

(52) U.S. Cl.
CPC .............. *G06F 3/013* (2013.01); *G06F 3/011* (2013.01); *H04N 13/128* (2018.05); *G06F 2203/012* (2013.01)

(58) Field of Classification Search
CPC ........ G06F 3/013; G06F 3/011; H04N 13/128
USPC .......................................................... 348/42
See application file for complete search history.

(56) References Cited

U.S. PATENT DOCUMENTS

| | | | |
|---|---|---|---|
| 2016/0320623 A1* | 11/2016 | Miyao | G02B 27/0172 |
| 2017/0212669 A1* | 7/2017 | Kim | G06F 3/011 |
| 2017/0237974 A1* | 8/2017 | Samec | G06F 3/013 |
| | | | 348/53 |

FOREIGN PATENT DOCUMENTS

| | | |
|---|---|---|
| CN | 104603673 A | 5/2015 |
| CN | 105892053 A | 8/2016 |
| CN | 105954875 A | 9/2016 |
| CN | 205581407 U | 9/2016 |
| CN | 206115030 U | 4/2017 |
| CN | 106843677 A | 6/2017 |
| CN | 106896504 A | 6/2017 |
| CN | 106950694 A | 7/2017 |

(Continued)

OTHER PUBLICATIONS

CN 106843677 Machine Translation (Year: 2017).*
(Continued)

*Primary Examiner* — Nguyen T Truong
(74) *Attorney, Agent, or Firm* — Foley & Lardner LLP (57) ABSTRACT

The present disclosure relates to a virtual reality display device and an adaptive parallax adjustment method for the virtual reality display device, which belong to the display technical field. The adaptive parallax adjustment method includes: obtaining pupil distance information of a user; and adjusting a position of a to-be-displayed image on a display screen according to the pupil distance information.

10 Claims, 5 Drawing Sheets

Obtain pupil distance information of a user — S11

Adjust a position of a to-be-displayed image on a display screen according to the pupil distance information — S12

(56) References Cited

FOREIGN PATENT DOCUMENTS

WO    WO-2017/122004 A1    7/2017

OTHER PUBLICATIONS

Chinese Office Action dated Nov. 2, 2018, from application No. 201710976848.1.
Chinese Office Action dated Nov. 26, 2019, from application No. 201710976848.1.

* cited by examiner

ADAPTIVE PARALLAX ADJUSTMENT METHOD AND VIRTUAL REALITY DISPLAY DEVICE

CROSS-REFERENCE TO RELATED APPLICATIONS

This application claims priority to Chinese Patent Application 201710976848.1, filed Oct. 19, 2017, the entire contents of which are incorporated herein by reference.

TECHNICAL FIELD

The present disclosure relates to the display technical field, and in particular, to an adaptive parallax adjustment method and a virtual reality display device.

BACKGROUND

VR (Virtual Reality) display devices generally include an imaging lens and a display screen. Because different users have different pupil distances, there may be differences in the sense of stereoscopic depth perceived by the users, and thus the VR display system cannot adapt to all users. Existing VR display systems (such as VR helmet) mostly use smart multimedia playback terminals (such as smart phones) as a calculation and display unit, installed in the front of the helmet. In the VR helmet, there are two sets of lens assemblies corresponding to the left and right eyes of a user, respectively. Since different users have different pupil distances, if the distance between the lens assemblies is constant (or fixed), some users may find it difficult to get a good experience when wearing the VR helmet.

SUMMARY

The present disclosure provides a virtual reality display device, an adaptive parallax adjustment method, an electronic device and a computer-readable medium, in order to at least overcome one or more problems as a result of limitations and deficiencies in related art.

Other features and advantages of the present disclosure will become apparent from the following detailed description, or may be learned in part through the practice of the present disclosure.

According to some arrangements of the present disclosure, there is provided an adaptive parallax adjustment method for a virtual reality display device, including obtaining pupil distance information of a user, and adjusting a position of a to-be-displayed image on a display screen according to the pupil distance information.

According to an exemplary arrangement of the present disclosure, the pupil distance information of the user is obtained using an eye tracking device.

According to an exemplary arrangement of the present disclosure, adjusting the position of the to-be-displayed image on the display screen according to the pupil distance information includes calculating an offset value of a center position of a left eye image and an offset value of a center position of a right eye image according to the pupil distance information, and adjusting the to-be-displayed image according to the offset value of the center position of the left eye image and the offset value of the center position of the right eye image according to the pupil distance information.

According to an exemplary arrangement of the present disclosure, calculating the offset value of the center position of the left eye image and the offset value of the center position of the right eye image according to the pupil distance information includes determining the center position of the left eye image and the center position of the right eye according to the pupil distance information in conjunction with a preset pupil distance-lens-screen distance matching relationship and calculating the offset value of the center position of the left eye image according to the center position of the left eye image and a standard center position of a left eye image corresponding to a standard pupil distance, and calculating the offset value of the center position of the right eye image according to the center position of the right eye image and a standard center position of a right eye image corresponding to the standard pupil distance.

According to an exemplary arrangement of the present disclosure, adjusting the to-be-displayed image according to the offset value of the center position of the left eye image and the offset value of the center position of the right eye image according to the pupil distance information includes shifting a left eye image portion of the to-be-displayed image according to the offset value of the center position of the left eye image, shifting a right eye image portion of the to-be-displayed image according to the offset value of the center position of the right eye image, and displaying the shifted image.

According to an exemplary arrangement of the present disclosure, adjusting the position of the to-be-displayed image on the display screen according to the pupil distance information includes calculating an offset value of a center position of a left eye image and an offset value of a center position of a right eye image according to the pupil distance information, determining an image center of a new stereoscopic space according to the offset value of the center position of the left eye image and the offset value of the center position of the right eye image, shifting the to-be-displayed image based on the image center of the new stereoscopic space, and displaying the shifted image.

According to an exemplary arrangement of the present disclosure, prior to displaying the shifted image, the method further includes performing an anti-distortion process on the shifted image.

According to an exemplary arrangement of the present disclosure, the preset pupil distance-lens-screen distance matching relationship refers to that a pupil center of a single eye, a lens center corresponding to the single eye and a screen center are in a straight line.

According to some arrangements of the present disclosure, there is provided a virtual reality display system, including a pupil distance detection device configured to obtain pupil distance information of a user, and an adjustment device configured to adjust a position of a to-be-displayed image on a display screen according to the pupil distance information.

According to some arrangements of the preset disclosure, there is provided a virtual reality display device, including a pupil distance detection device configured to obtain pupil distance information of a user, a processor, and a memory having programs stored therein. The processor executes the programs to perform the steps in the adaptive parallax adjustment methods.

According to some arrangements of the present disclosure, there is provided a computer-readable medium having computer-executable instructions stored thereon. The executable instructions are executed by a processor to perform steps in the adaptive parallax adjustment methods as described above.

BRIEF DESCRIPTION OF THE DRAWINGS

The accompanying drawings herein are incorporated in and constitute a part of this specification, illustrate arrangements consistent with the present disclosure, and together with the description serve to explain the principles of the disclosure. Obviously, the drawings in the following description are merely some exemplary arrangements of the present disclosure, and those skilled in the art can also obtain other arrangements based on these drawings.

DETAILED DESCRIPTION

Example arrangements will now be described more fully with reference to the accompanying drawings. However, exemplary arrangements can be implemented in various forms and should not be construed as limited to the examples set forth herein; rather, these arrangements are provided so that this disclosure will be more complete, and will fully convey the concept of the exemplary arrangements. For those skilled in the art, the drawings are merely schematic illustrations of the present disclosure and are not necessarily drawn to scale. The same reference numerals in the drawings denote the same or similar parts, and repeated descriptions thereof will be omitted.

Furthermore, the described features, structures, or characteristics may be combined in any suitable manner in one or more arrangements. In the following description, numerous specific details are provided to provide a thorough understanding of the arrangements of the present disclosure. However, those skilled in the art will recognize that the technical solutions of the present disclosure may be practiced by omitting one or more of the specific details, or other methods, components, devices, steps, etc. may be employed. In other instances, well-known structures, methods, apparatus, implementations, materials, or operations are not shown or described in detail to avoid obscuring aspects of the present disclosure.

Figure 1:
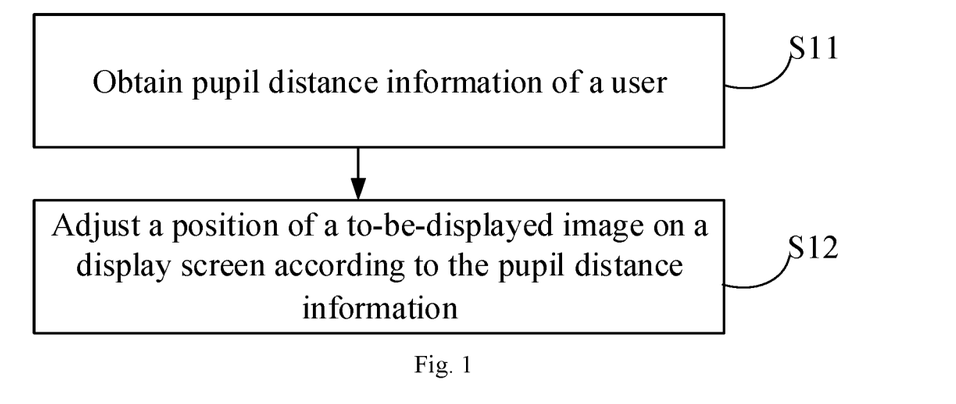
FIG. 1 shows a schematic flowchart of an adaptive parallax adjustment method according to an arrangement of the present disclosure.

FIG. 1 shows a schematic diagram of an adaptive parallax adjustment method for a virtual reality VR display system according to an arrangement of the present disclosure. As shown in FIG. 1, the method includes:

In S11, pupil distance information of a user is obtained.

In S12, a position of a to-be-displayed image on a display screen is adjusted according to the pupil distance information.

The pupil distance refers to the distance between the pupils of two eyes. Under normal circumstances, due to the differences in the features such as height and face, there may be large differences in the pupil distances between eyes. Different users have different faces, and the pupil distance is not constant. For example, a child may have a small pupil distance while an adult may have a large pupil distance. Also, the pupil distance of one person may change as the person gets older. The range of the pupil distance of an adult is generally 58-70 mm, the pupil distance of an average male adult is between 60-73 mm and female is 53-68 mm. If the VR display system adopts a fixed structural design, different users can see different display positions on the screen through the imaging lens, and thus may experience different depth effects when generating binocular three-dimensional space, and even the two images cannot be fused (or integrated).

In view of the above, in this arrangement, by obtaining pupil distance information of a user and then adjusting left eye and right eye images according to the pupil distance information, it can be ensured that for users with different pupil distances, the lens center, the image center and position of the pupils of the users can be in a straight line. Thus, a good virtual reality experience can be achieved.

In the adaptive parallax adjustment method provided by some arrangements of the present disclosure, the pupil distance information of a user who uses a VR display system is obtained and the to-be-displayed image is adjusted according to the pupil distance information. In this way, when the pupil distance of the user changes, the center of the displayed image is also changed accordingly, so that the image viewed by the user can be changed according to his/her own pupil changes without using a complicated hardware adjustment mechanism, thereby providing the user with a good user experience.

In S11 of this arrangement, an eye tracking device may be used to obtain the pupil distance information of the user. For example, an eye tracking device (including an infrared device and an image acquisition device) on the VR display system may be used. The eye tracking device collects the pupil distance information of the human eye according to initial settings. The operating principle may be as follows: a standard pupil distance is set according to a standard face; when the user wears the VR display system, the eye tracking device (such as an image acquisition device) collects the image regarding the pupil distance of the user to directly obtain the pupil distance; or, the pupil distance information is obtained by comparing the collected image regarding the pupil distance with the standard pupil distance.

Figure 2:
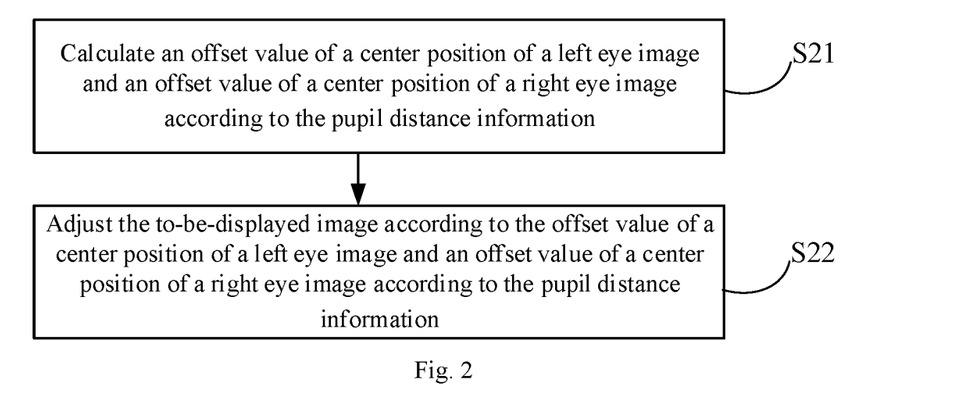
FIG. 2 shows a schematic flowchart of adjusting the to-be-displayed image according to the pupil distance information in S12 as shown in FIG. 1 according to a first arrangement of the present disclosure.

FIG. 2 shows a schematic flowchart of adjusting the to-be-displayed image according to the pupil distance information in S12 as shown in FIG. 1 according to a first arrangement of the present disclosure.

Figure 3:
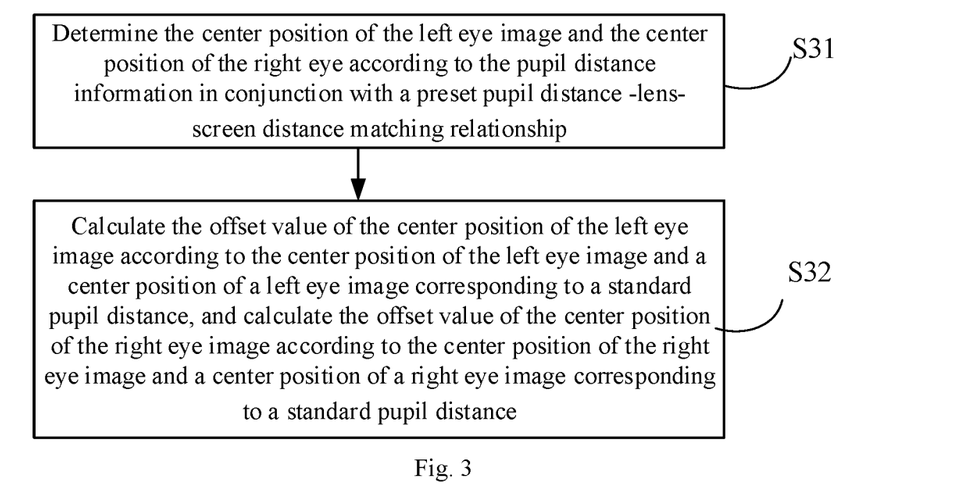
FIG. 3 shows a schematic flowchart of S21 as shown in FIG. 2 according to the first arrangement of the present disclosure.

As shown in FIG. 2, in S21, an offset value of a center position of a left eye image and an offset value of a center position of a right eye image are calculated according to the pupil distance information. FIG. 3 shows a schematic flowchart of determining the offset value according to the pupil distance information in conjunction with a preset pupil distance-lens-screen distance matching relationship.

As shown in FIG. 2, in S22, the to-be-displayed image is adjusted according to the offset value of a center position of a left eye image and an offset value of a center position of a right eye image according to the pupil distance information.

FIG. 3 shows a schematic flowchart of S21 (the of calculating an offset value of a center position of a left eye image and an offset value of a center position of a right eye image according to the pupil distance information) as shown in FIG. 2 according to the first arrangement of the present disclosure.

As shown in FIG. 3, in S31, the center position of the left eye image and the center position of the right eye are determined according to the pupil distance information in conjunction with a preset pupil distance-lens-screen distance matching relationship. The preset pupil distance-lens-screen distance matching relationship refers to that a pupil center of a single eye (e.g., a left eye), a lens center corresponding to the left eye and a screen center corresponding to the left eye are in a straight line.

As shown in FIG. 3, in S32, the offset value of the center position of the left eye image is calculated according to the center position of the left eye image and a standard center position of a left eye image corresponding to a standard pupil distance, and the offset value of the center position of the right eye image is calculated according to the center position of the right eye image and a standard center position of a right eye image corresponding to the standard pupil distance.

When users with different pupil distances wear a VR display system, the matching relationship between the position of the human eye, the imaging lens, and the image content displayed on the screen also changes due to a difference between the pupil distances and the standard pupil distance.

Figure 4:
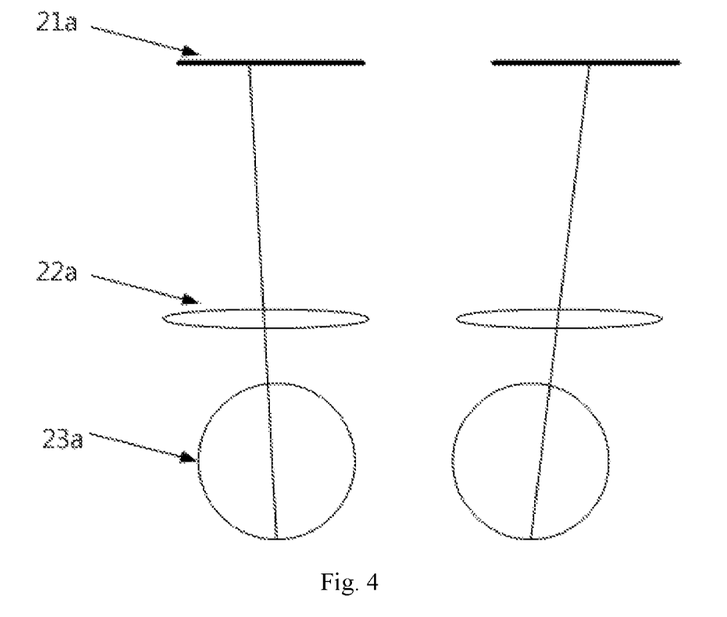
FIG. 4 shows a schematic view of the optical path when the pupil distance of a user is smaller than the standard pupil distance according to the first arrangement of the present disclosure.
Figure 5:
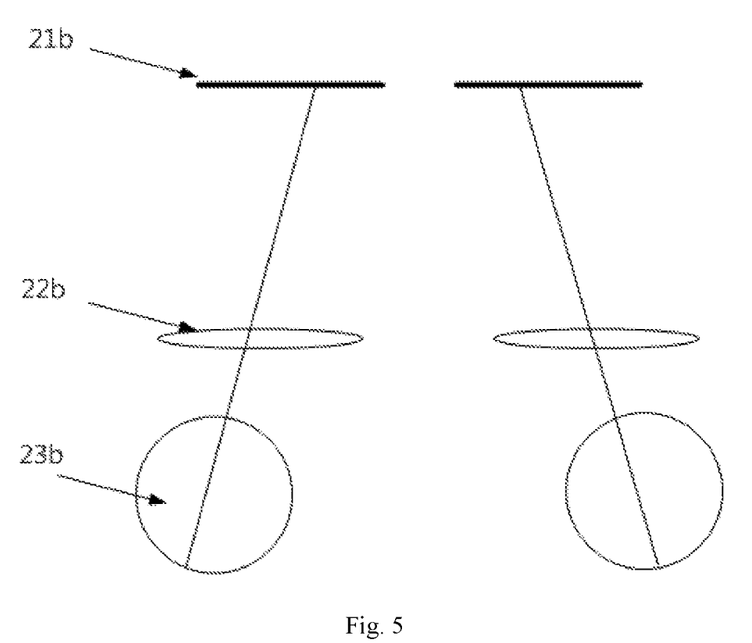
FIG. 5 shows a schematic view of the optical path when the pupil distance of a user is greater than the standard pupil distance according to the first arrangement of the present disclosure.

FIG. 4 shows a schematic view of the optical path when the pupil distance of a user is smaller than the standard pupil distance, and FIG. 5 shows a schematic view of the optical path when the pupil distance of a user is greater than the standard pupil distance. In FIGS. 4 and 5, 21a and 21b denote screens, 22a and 22b denote imaging lenses, and 23a and 23b denote user's eyes. According to the preset pupil distance-lens-screen distance matching relationship, when the pupil distance information and the standard pupil distance are the same, the screen center coincides with the image center; when the pupil distance information and the standard pupil distance are inconsistent, there is an offset (or deviation) between the screen center and the image center.

As can be seen from FIG. 4, when the pupil distance of the user is smaller than the standard pupil distance, the intersection point of the line connecting the user's pupil and the imaging lens on the screen 21a (or 21b) is the center of the sight of the user, and the intersection point slightly moves outward as compared with the screen center. As can be seen from FIG. 5, when the pupil distance of the user is greater than the standard pupil distance, the intersection point of the line connecting the user's pupil and the imaging lens on the screen 21a (or 21b) is the center of the sight of the user, and in this case the intersection point slightly moves inwards as compared with the screen center. When it is ensured that the image center and the center of the sight of the user is consistent, the user can have good viewing experience.

As can be seen from FIGS. 4 and 5, when the difference between the user's pupil distance and the standard pupil distance is relatively great, because the distance between the centers of the two lenses is unchanged, the inclination angles of the straight lines formed by the pupils and the lens centers and the image centers are relatively great, and the shift (or offset) of the image center with respect to the screen center is relatively great. When the difference between the user's pupil distance and the standard pupil distance is relatively small, the inclination angles of the straight lines formed by the pupils and the lens centers and the image centers are relatively small, and the shift (or offset) of the image center with respect to the screen center is relatively small. According to the preset pupil distance-lens-screen distance matching relationship, for users with different pupil distances, the position, where the center of the binocular images is, varies. That is, the projection positions of the same screen content on the retinas of users having different pupil distances are different. Thus, different users may have different perceptions (or senses) of stereoscopic depth. Therefore, in this arrangement, the image displayed on the screen is adjusted to adapt to users with different pupil distances, so as to satisfy the stereoscopic effect experience requirements of different users.

In the arrangement, the lens center distances shown in FIGS. 4 and 5 may be fixed values. Generally, in order to satisfy most people's viewing comfort, according to statistical results, the lens center distance is usually 53 mm or 53.5 mm. Therefore, the arrangement does not require a complicated lens adjusting device to make the pupil distance match the center distance of the lenses.

Because the distance between the centers of the lenses is fixed and users with different pupil distances view the screen from different angles, in order to make the range of visual field (field of view) that the users with different pupil distances can see through the imaging lens does not change significantly, the size of the screen for displaying the binocular images used in VR display system is greater than the size of the visual field formed by the lenses, so that when the viewing angle changes, no missing of viewing content occurs.

In S32, the offset value of the center position of the left eye image and the offset value of the center position of the right eye image are calculated based on the pupil distance information, that is, the offset values of the intersection points of the lines connecting the user's pupils and the imaging lens centers on the screen 21a (or 21b) relative to the centers of the screens are calculated.

It should be noted that, the VR display system in this arrangement may use a single display screen to display the left-eye image and the right-eye image, i.e., the display screen can be divided for displaying the left-eye image and the right-eye image. For example, one display screen may be divided into two screens to display corresponding images. The coordinates of the centers of the binocular images may be marked or determined in one coordinate system or in two coordinate systems. It is also possible to display the left-eye image and the right-eye image using two screens having a certain interval (or gap, or distance). For example, two screens may be used to display the left-eye image and the right-eye image, respectively. For the situation that two screens are used to display the left-eye image and the right-eye image, respectively, the coordinates are usually marked in the respective screen coordinate system.

Since the position of the screen 21a or 21b is fixed, the coordinate position of the screen center is also fixed. When the position of the screen is set in the design process, the position of the screen center corresponds to the standard pupil, i.e., the intersection point between the display screen and the line connecting the pupil corresponding to the standard pupil distance and the lens is in the center position of the screen. When the user's pupil distance is different from the standard pupil distance, the calculated center position of the left eye image is shifted relative to the center position of the screen displaying the left eye image. The shift value can be calculated based on the coordinates of the center position of the left eye image and the coordinates of the center of the screen. The offset value may be represented in the form of a vector or an offset distance depending on specific calculation processes, and the present disclosure does not impose specific limitations on this.

Figure 6:
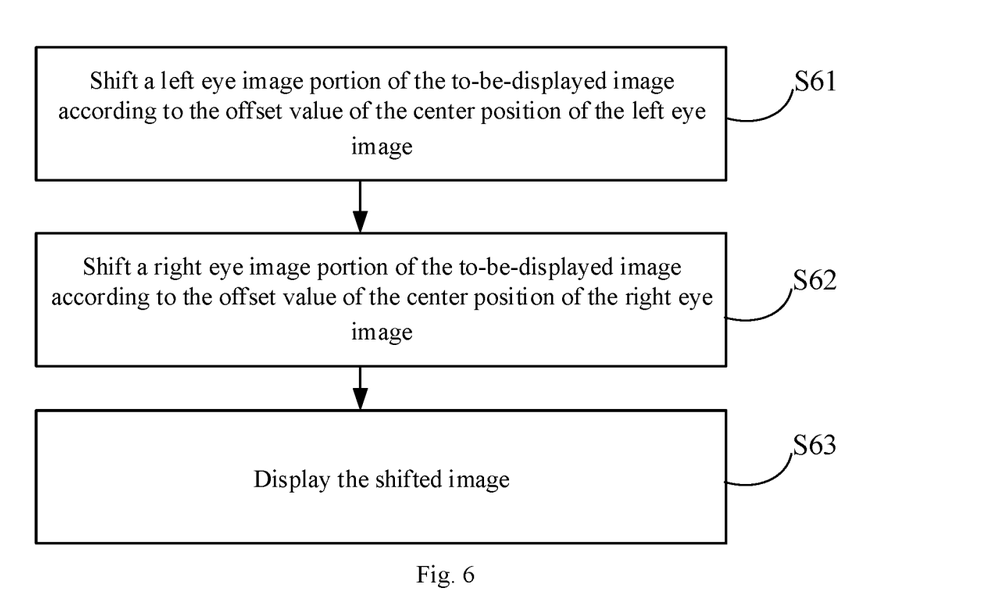
FIG. 6 shows a schematic flowchart of S22 as shown in FIG. 2 according to the first arrangement of the present disclosure.

After obtaining the offset value of the center position of the left eye image and the offset value of the center position of the right eye image, a translating operation (or a shifting operation) is performed accordingly. FIG. 6 shows a schematic flowchart of S22 (in which the to-be-displayed image is adjusted according to the offset value of a center position of a left eye image and an offset value of a center position of a right eye image according to the pupil distance information) in the first arrangement of the present disclosure.

As shown in FIG. 6, in S61, a left eye image portion of the to-be-displayed image is shifted (or translated) according to the offset value of the center position of the left eye image.

As shown in FIG. 6, in S62, a right eye image portion of the to-be-displayed image according to the offset value of the center position of the right eye image.

As shown in FIG. 6, in S63, the shifted image is displayed.

It should be noted that, since the edges and corners of the screen after the translation are changed with respect to the center of the new image, the method further includes: performing an anti-distortion process on the shifted image, and displaying the processed image.

The anti-distortion process in this arrangement needs to calculate the anti-distortion parameters. The normal anti-distortion data is generated by different radius distortion data of the VR lens, that is, inverse adjustments are performed in a software model with respect to the distortions corresponding to the pixel points on the display screen. The parameters required for performing the anti-distortion process include the size and resolution of the display screen, a distortion curve with the center of the screen as the origin, and so on. Based on the above calculation parameters, the VR image content is adjusted according to the distortion model, and the image content after the anti-distortion process can be obtained. In this way, after the content displayed on the display screen passes through the VR lens, the content seen by the human eye is consistent with the content of the original image.

Figure 7:
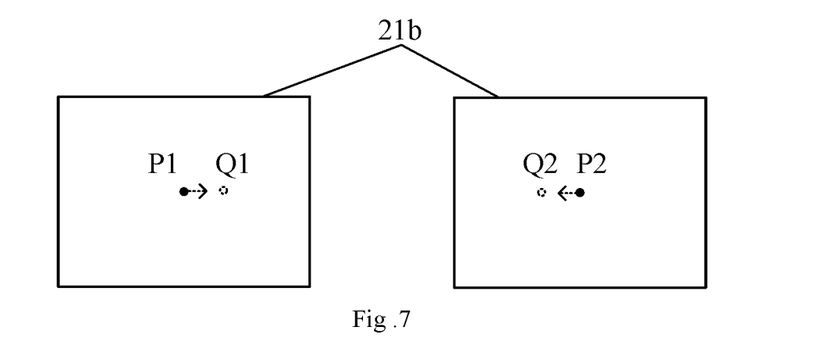
FIG. 7 shows an effect diagram based on the flowchart shown in FIG. 6 according to the first arrangement of the present disclosure.

FIG. 7 shows an effect diagram based on the flowchart shown in FIG. 6. Taking the situation in FIG. 5 in which the pupil distance of the user is greater than the standard pupil distance as an example, P1 and P2 in FIG. 7 are the screen center for displaying the left eye image and the screen center for displaying the right eye image on the display screen 21b. Because there is a difference between the user's pupil distance and the standard pupil distance, Q1 and Q2 are the centers of the left eye image and the right eye image on the display screen 21b, and the offset value of the center position of the left eye image and the offset value of the center position of the left eye image are calculated by S32. Correspondingly, the part corresponding to the left eye and the part corresponding to the right eye in the to-be-displayed image need to be translated or shifted according to their respective offset values, as shown by arrows in FIG. 7, that is, the left eye image and the right eye image are both shifted in a direction close to each other with respect to the centers of the respective screens. In this way, the displayed image can be adapted to the user's pupil distance, and the user's viewing experience can be improved.

Figure 8:
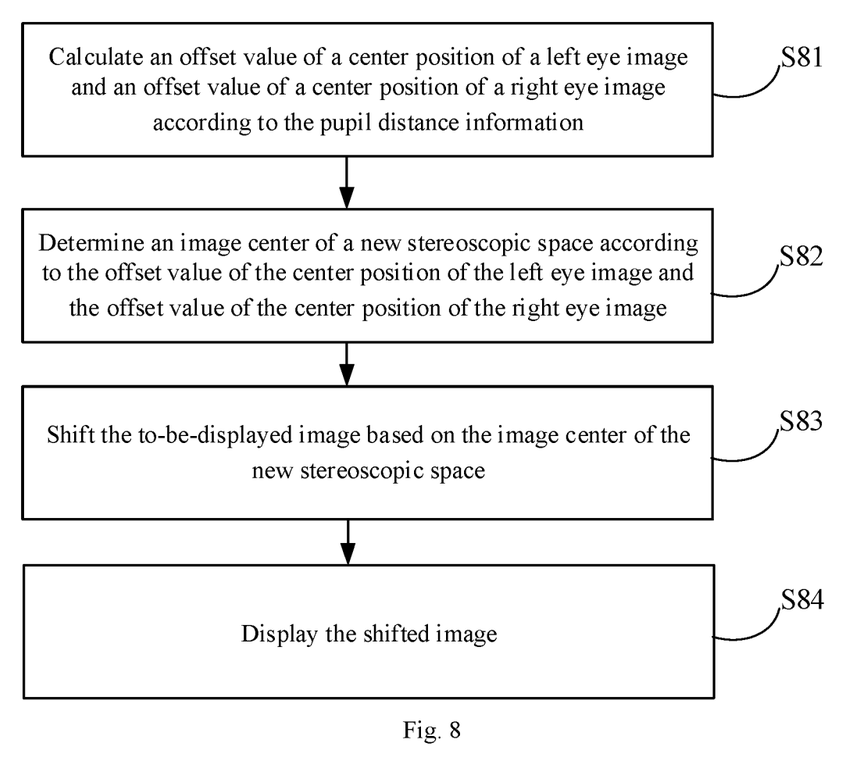
FIG. 8 shows a schematic flowchart of S12 according to a second arrangement of the present disclosure.

FIG. 8 shows a schematic flowchart of S12 (in which the to-be-displayed image is adjusted according to the pupil distance information) according to a second arrangement of the present disclosure.

As shown in FIG. 8, in S81, an offset value of a center position of a left eye image and an offset value of a center position of a right eye image are calculated according to the pupil distance information. For the specific calculation in S81, reference may be made to the description of S21 in the first arrangement, which is not repeated here.

As shown in FIG. 8, in S82, an image center of a new stereoscopic space is determined according to the offset value of the center position of the left eye image and the offset value of the center position of the right eye image. Since the position of the user's pupil is shifted with respect to the center of the lens and the center of the screen, the viewing position of the user with the standard pupil distance changes, and the corresponding image center of the three-dimensional space determined by binocular synthesis also changes. Therefore, it is necessary to determine the center of the new stereoscopic image.

As shown in FIG. 8, in S83, the to-be-displayed image is shifted based on the image center of the new stereoscopic space.

As shown in FIG. 8, in S84, the translated or shifted image is displayed.

It should be noted that, after the translation, the method further includes: performing an anti-distortion process on the translated image, and displaying the processed image. In the case of no distortion, the content displayed on the screen at each coordinate point will not change. Since the center of the image of the new stereoscopic space is determined and the to-be-displayed image is translated, the distances between the corners or edges of the screen relative to the newly determined center of the image of the three-dimensional space are changed. Therefore, the anti-distortion parameters need to be calculated again as in the previous arrangement to generate new anti-distortion results. The image content thus generated is an extension of the content displayed on the original screen. Therefore, the image displayed on the edge of the display screen after adjustment is not the same as the image displayed on the edge of the display screen before adjustment.

FIG. 7 shows an effect diagram based on the flowchart shown in FIG. 6. Taking the situation in FIG. 5 in which the pupil distance of the user is greater than the standard pupil distance as an example, P1 and P2 in FIG. 7 are the screen center for displaying the left eye image and the screen center for displaying the right eye image on the display screen 21b. Because there is a difference between the user's pupil distance and the standard pupil distance, Q1 and Q2 are the centers of the left eye image and the right eye image on the display screen 21b, and the offset value of the center position of the left eye image and the offset value of the center position of the left eye image are calculated by S32. Correspondingly, the part corresponding to the left eye and the part corresponding to the right eye in the to-be-displayed image need to be translated or shifted according to their respective offset values, as shown by arrows in FIG. 7, that is, the left eye image and the right eye image are both shifted in a direction close to each other with respect to the centers of the respective screens. In this way, the displayed image can be adapted to the user's pupil distance, and the user's viewing experience can be improved.

Figure 9:
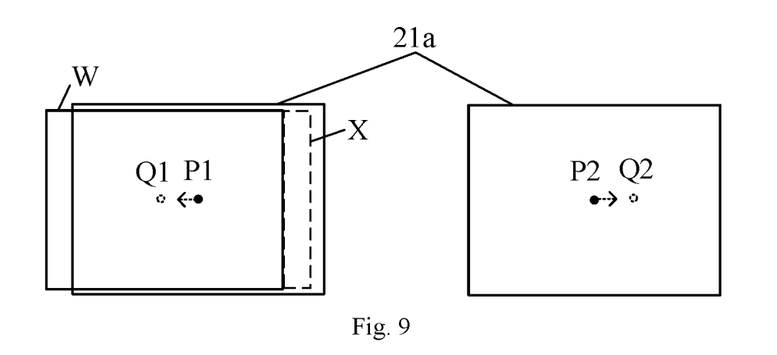
FIG. 9 shows an effect diagram based on the flowchart shown in FIG. 8 according to the second arrangement of the present disclosure.

FIG. 9 shows an effect diagram based on the flowchart shown in FIG. 8. Taking the situation in FIG. 4 in which the pupil distance of the user is smaller than the standard pupil distance as an example, P1 and P2 in FIG. 9 are the screen center for displaying the left eye image and the screen center for displaying the right eye image on the display screen 21b. Because there is a difference between the user's pupil distance and the standard pupil distance, Q1 and Q2 are the centers of the left eye image and the right eye image on the display screen 21b, and the offset value of the center position of the left eye image and the offset value of the center position of the left eye image are calculated by S32. Correspondingly, the part corresponding to the left eye and the part corresponding to the right eye in the to-be-displayed image need to be translated or shifted according to their respective offset values, as shown by arrows in FIG. 9, that is, the left eye image and the right eye image are both shifted in a direction apart from each other with respect to the centers of the respective screens. The edge image is extended and displayed, the content in the solid line frame W in FIG. 9 is the content of the shifting display, and the content in the dotted line frame X is the content of the extended display, which can increase the depth of field of the image. Also, the displayed image can be adapted to the user's pupil distance, thereby enhancing the user's viewing experience. In FIG. 9, only the display of the left eye image is shown as an example for illustration, and the display principle of the right eye image is the same and repeated description is omitted.

In summary, the parallax adjustment method provided in the above arrangement of the disclosure does not need to add a complicated lens adjustment device, but obtains the pupil distance information through the pupil distance detection, and then adjusts the to-be-displayed image according to the pupil distance information, so that users with different pupil distances can have a good user experience.

Further, the present disclosure also provides an adaptive parallax adjustment method for a virtual reality VR display system. Based on the above-described first and second arrangements in which the parallax adjustment method is implemented based on software to adjust the image, a lens adjustment device and/or a screen spacing adjustment device may be added to adjust the distance between the centers of the lenses and/or the screen distance based on pupil distance information. That is, the hardware adjustment is combined with the above software adjustment to achieve a better binocular image fusion effect. The lens adjustment device or the screen distance adjusting device used in this arrangement can feed back its corresponding position to the processor that implements the above software adjustment, and the processor uses the above information and the user's pupil distance information to calculate the matching left eye image and right eye image and display the images on the display screen.

Because the pupil distance information of different users may be different, the VR display system will set the center distance between the two lenses according to a standard pupil distance in the design. Therefore, when the user's pupil distance information changes, the distance between the centers of the lenses is adjusted according to the pupil distance information. The adjustment of the center distance of the lenses according to the pupil distance information includes: determining whether the pupil distance of the VR display system matches the user's pupil distance, the pupil distance of the VR display system being the lens center distance of the VR display system (or can be understood as the distance between the focuses of the two lenses); when the pupil distance of the VR display system does not match the pupil distance of the user, adjusting the pupil distance of the VR display system so that the pupil distance of the adjusted VR display system matches the user's pupil distance. For example, an adjustment mechanism may be added to the VR display system to adjust the pupil distance of the VR display system, which can improve the visual experience of the user wearing the VR display system.

Since it is necessary to satisfy that the position of the lens center and the image center and the pupil position of the human eye are in a straight line, the position of the screen can be adjusted in addition to the adjustment of the lens, so as to change the correspondence between the screen position and the displayed image center. The principle of adjusting the screen distance according to the pupil distance information is similar to the principle of adjusting the lens. An adjustment mechanism may be added to the VR display system to adjust the position of the screen, thereby improving the user's visual experience.

In summary, in the present arrangement, by changing the correspondence relationship between the lens position (or the screen position) and the display content center, it is possible to make up for the defect that the user experience cannot be achieved by simply adjusting the pupil distance or adjusting the screen, and thus users with different pupil distances can get a good VR experience.

Figure 10:
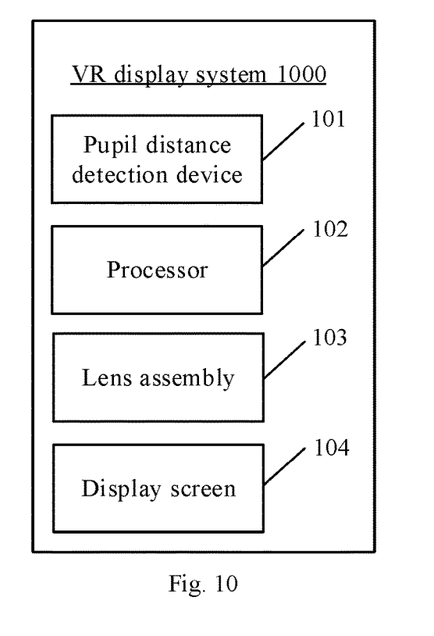
FIG. 10 shows a schematic diagram of a virtual reality VR display system according to a third arrangement of the present disclosure.

FIG. 10 shows a schematic diagram of a virtual reality VR display system according to a third arrangement of the present disclosure. As shown in FIG. 10, the VR display system 1000 includes: an pupil distance detection device 101, a processor 102, a lens assembly 103, and a display screen 104.

The pupil distance detection device 101 may be an eyeball tracking device configured to acquire the user's pupil distance information. The processor 102 includes an adjustment module configured to adjust the to-be-displayed image according to the pupil distance information. The function achieved by the adjustment module is described in the above arrangements. The lens assembly 103 is disposed between the human eye and the display screen 104. The display screen 104 is used to display the adjusted image.

The VR display system provided by the present arrangement can achieve the same technical effects as the above parallax adjustment methods, which will not be repeated herein.

In some examples, the present disclosure also provides an electronic device including a processor and a memory. The memory stores operation instructions which cause the processor to perform the adjustment method which includes obtaining pupil distance information of a user, and adjusting a position of a to-be-displayed image on a display screen according to the pupil distance information.

Figure 11:
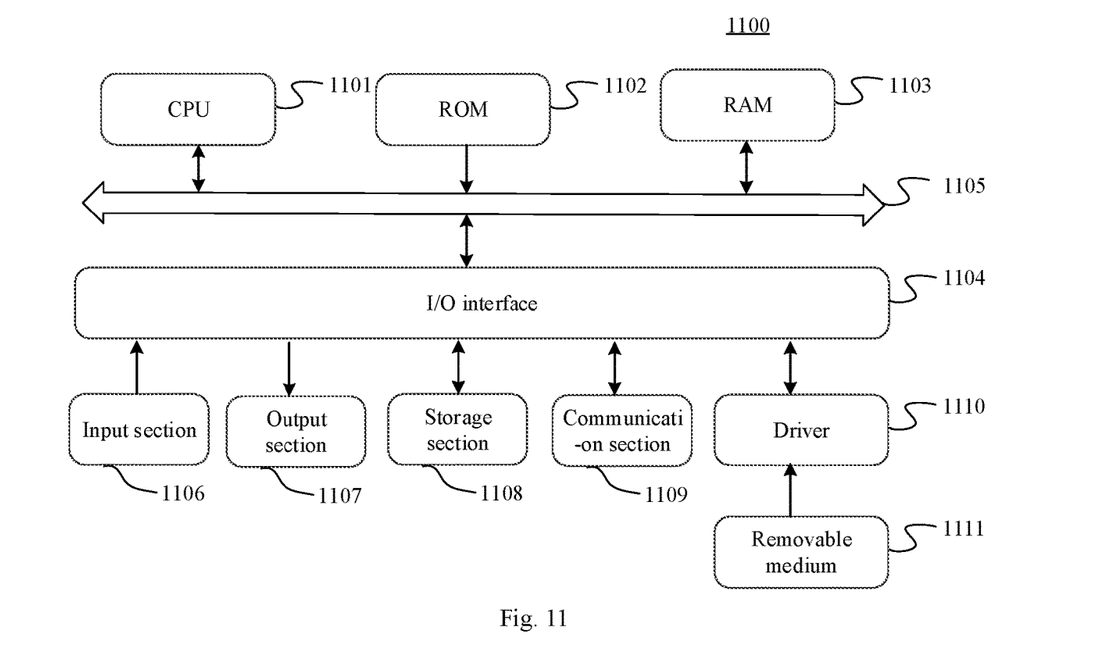
FIG. 11 is a schematic structural diagram of a computer system of an electronic device according to an arrangement of the present disclosure.

FIG. 11 is a schematic structural diagram of a computer system 1100 of an electronic device according to an arrangement of the present disclosure. The electronic device shown in FIG. 11 is merely an example and should not impose any limitation on the function and scope of use of the arrangements of the present disclosure. The computer system herein may be a complicated computer system applied to a computer, or may be a micro computer system applied to a mobile device such as a mobile phone.

As shown in FIG. 11, the computer system 1100 includes a central processing unit (CPU) 1101, which can perform various activities and processes according to programs stored in a read only memory (ROM) 1102 or programs loaded into a random access memory (RAM) 1103. In the RAM 1103, various programs and data required for the operation of the system 1100 are also stored. The CPU 1101, the ROM 1102, and the RAM 1103 are connected to each other via a bus 1104. An input/output (I/O) interface 1105 is also connected to bus 1104.

The following components are connected to the I/O interface 1105: an input section 1106 including a keyboard, a mouse, and the like; an output section 1107 including a cathode ray tube (CRT), a liquid crystal display (LCD), a speaker and the like; a storage section 1108 including a hard disk or the like; and a communication section 1109 including a network interface card such as a LAN card, a modem, and the like. The communication section 1109 performs communication processing via a network such as the Internet. The driver 1110 is also connected to the I/O interface 1105 as needed. A removable medium 1111 such as a magnetic disk, an optical disk, a magneto-optical disk, a semiconductor memory, or the like is mounted on the drive 1110 as needed so that the computer program read therefrom can be installed into the storage section 1108 as needed.

In particular, according to an arrangement of the present disclosure, the processes described above with reference to the flowcharts may be implemented as a computer software program. For example, an arrangement of the present disclosure provides a computer program product including a computer program embodied on a computer-readable medium, the computer program containing program codes for performing the methods illustrated in the flowcharts. In such an arrangement, the computer program may be downloaded and installed from the network through the communication section 1109, and/or installed from the removable media 1111. When the computer program is executed by the central processing unit (CPU) 1101, the above-described functions defined in the system of the present disclosure are executed.

It should be noted that the computer-readable medium shown in the present disclosure may be a computer-readable signal medium or a computer-readable medium or any combination thereof. The computer-readable medium may be, for example but not limited to, an electronic, magnetic, optical, electromagnetic, infrared, or semiconductor system, apparatus, or device, or any combination of the above. More specific examples of the computer-readable medium may include, but are not limited to, an electrical connection with one or more wires, a portable computer disk, a hard disk, a random access memory (RAM), a read-only memory (ROM), and an erasable programmable Read-only memory (EPROM or flash memory), optical fiber, compact disk read-only memory (CD-ROM), optical storage device, magnetic storage device, or any suitable combination of the above. In the present disclosure, the computer-readable medium may be any tangible medium that contains or stores a program that can be used by or in conjunction with an instruction execution system, apparatus, or device. In the present disclosure, the computer-readable signal medium may include a data signal that propagates in baseband or as part of a carrier wave carrying computer-readable program codes. Such propagated data signals may have a variety of forms, including but not limited to electromagnetic signals, optical signals, or any suitable combination of the above. The computer-readable signal medium may also be any computer-readable medium other than a computer-readable medium that can transmit, communicate, or transport a program for use by or in connection with an instruction execution system, apparatus, or device. Program codes embodied on a computer readable medium may be transmitted using any suitable medium, including but not limited to wireless, wireline, fiber optic cable, RF, etc., or any suitable combination of the above.

The flowcharts and block diagrams in the figures illustrate the architecture, functionality, and operation of possible implementations of systems, methods, and computer program products according to various arrangements of the present disclosure. In this regard, each block in the flowcharts or block diagrams may represent a module, a program segment, or a portion of codes, and a part of the above-mentioned modules, program blocks, or codes may include one or more executable functions for implementing specified logic functions. It should also be noted that in some alternative implementations, the functions noted in the blocks may also occur in different orders than those described in the figures. For example, two consecutively represented blocks may be executed substantially in parallel, and they may sometimes be executed in a reverse order, depending on the functions involved. It is also to be noted that each block in the block diagram or the flowchart, and combinations of blocks in the block diagrams and the flowcharts, may be implemented by a dedicated hardware-based system that performs specified functions or operations, or may be implemented by a combination of the dedicated hardware and computer instructions.

The units described in the arrangements of the present disclosure may be implemented through software, and may also be implemented through hardware. The described units may also be arranged in a processor. For example, a processor may be described as: a processor includes a sending unit, an obtaining unit, a determining unit and a first processing unit. The names of these units do not constitute a limitation of the unit itself in some cases. For example, the sending unit may also be described as "a unit that sends a picture acquisition request to a connected server".

In some examples, the present disclosure also provides a computer-readable medium, which may be included in the device described in the above arrangements, or may exist alone and not be incorporated into the device. The above computer-readable medium carries one or more programs. When the one or more programs are executed by one device, the device obtains pupil distance information of a user and adjusts a position of a to-be-displayed image on a display screen according to the pupil distance information.

It should be clearly understood that the present disclosure describes how to make and use specific examples, but the principles of the present disclosure are not limited to any of these examples. Rather, based on the teachings of this disclosure, these principles can be applied to many other arrangements.

The exemplary arrangements of the present disclosure have been specifically illustrated and described above. It is to be understood that the present disclosure is not intended to be limited to the details of construction, arrangement, or implementation set forth herein; rather, the present disclosure is intended to cover various modifications and equivalent arrangements within the spirit and scope as defined by the appended claims.

What is claimed is:

1. An adaptive parallax adjustment method for a virtual reality display device, comprising:
obtaining pupil distance information of a user;

adjusting a position of a to-be-displayed image on a display screen according to the pupil distance information;

calculating anti-distortion parameters;

performing an anti-distortion process according to the anti-distortion parameters based on a distortion model; and performing an anti-distortion process on the to-be-displayed image prior to displaying the to-be-displayed image, wherein the pupil distance information of the user is obtained using an eye tracking device;

wherein adjusting the position of the to-be-displayed image on the display screen according to the pupil distance information comprises:

calculating an offset value of a center position of a left eye image and an offset value of a center position of a right eye image according to the pupil distance information; and adjusting the to-be-displayed image according to the offset value of the center position of the left eye image and the offset value of the center position of the right eye image according to the pupil distance information;

wherein calculating the offset value of the center position of the left eye image and the offset value of the center position of the right eye image according to the pupil distance information comprises:

determining the center position of the left eye image and the center position of the right eye image according to the pupil distance information in conjunction with a preset pupil distance-lens-screen distance matching relationship; and calculating the offset value of the center position of the left eye image according to the center position of the left eye image and a standard center position of the left eye image corresponding to a standard pupil distance, and calculating the offset value of the center position of the right eye image according to the center position of the right eye image and a standard center position of the right eye image corresponding to the standard pupil distance.

2. The adaptive parallax adjustment method according to claim 1, wherein adjusting the to-be-displayed image according to the offset value of the center position of the left eye image and the offset value of the center position of the right eye image according to the pupil distance information comprises: shifting a left eye image portion of the to-be-displayed image according to the offset value of the center position of the left eye image; shifting a right eye image portion of the to-be-displayed image according to the offset value of the center position of the right eye image; and displaying the shifted image.

3. The adaptive parallax adjustment method according to claim 1, wherein adjusting the position of the to-be-displayed image on the display screen according to the pupil distance information comprises:

calculating an offset value of a center position of a left eye image and an offset value of a center position of a right eye image according to the pupil distance information;

determining an image center of a new stereoscopic space according to the offset value of the center position of the left eye image and the offset value of the center position of the right eye image;

shifting the to-be-displayed image based on the image center of the new stereoscopic space; and displaying the shifted image.

4. The adaptive parallax adjustment method according to claim 1, wherein the preset pupil distance-lens-screen distance matching relationship corresponds to a pupil center of a single eye, a lens center corresponding to the single eye and a screen center are in a straight line.

5. A virtual reality display device, comprising:

a pupil distance detection device configured to obtain pupil distance information of a user;

a processor; and a memory having programs stored therein:

wherein the processor executes the programs to:

receive the pupil distance information of the user, wherein the pupil distance information of the user is obtained using an eye tracking device;

adjust a position of a to-be-displayed image on a display screen according to the pupil distance information;

calculate an offset value of a center position of a left eye image and an offset value of a center position of a right eye image according to the pupil distance information;

adjust the to-be-displayed image according to the offset value of the center position of the left eye image and the offset value of the center position of the right eye image according to the pupil distance information;

determine the center position of the left eye image and the center position of the right eye image according to the pupil distance information in conjunction with a preset pupil distance-lens-screen distance matching relationship;

calculate the offset value of the center position of the left eye image according to the center position of the left eye image and a standard center position of the left eye image corresponding to a standard pupil distance, and calculating the offset value of the center position of the right eye image according to the center position of the right eye image and a standard center position of the right eye image corresponding to the standard pupil distance, and perform an anti-distortion process on the to-be-displayed image prior to displaying the to-be-displayed image.

6. The virtual reality display device according to claim 5, wherein the processor is configured to: shift a left eye image portion of the to-be-displayed image according to the offset value of the center position of the left eye image; shift a right eye image portion of the to-be-displayed image according to the offset value of the center position of the right eye image; and display the shifted image.

7. The virtual reality display device according to claim 5, wherein the processor is configured to:

calculate an offset value of a center position of a left eye image and an offset value of a center position of a right eye image according to the pupil distance information;

determine an image center of a new stereoscopic space according to the offset value of the center position of the left eye image and the offset value of the center position of the right eye image;

shift the to-be-displayed image based on the image center of the new stereoscopic space; and display the shifted image.

8. The virtual reality display device according to claim 5, wherein the preset pupil distance-lens-screen distance matching relationship corresponds a pupil center of a single eye, a lens center corresponding to the single eye and a screen center are in a straight line.

9. The virtual reality display device according to claim 5, wherein a size of the screen for displaying binocular images in the virtual reality display device is larger than a size of the field of view formed by a lens in the virtual reality display device.

10. A non-transitory computer-readable medium having computer-executable instructions stored thereon, wherein the executable instructions are executed by a processor to perform an adaptive parallax adjustment method, wherein the adaptive parallax adjustment method comprises:

obtaining pupil distance information of a user;

adjusting a position of a to-be-displayed image on a display screen according to the pupil distance information;

performing an anti-distortion process on the to-be-displayed image prior to displaying the to-be-displayed image, wherein the pupil distance information of the user is obtained using an eye tracking device;

wherein adjusting the position of the to-be-displayed image on the display screen according to the pupil distance information comprises:

calculating an offset value of a center position of a left eye image and an offset value of a center position of a right eye image according to the pupil distance information; and adjusting the to-be-displayed image according to the offset value of the center position of the left eye image and the offset value of the center position of the right eye image according to the pupil distance information;

wherein calculating the offset value of the center position of the left eye image and the offset value of the center position of the right eye image according to the pupil distance information comprises:

determining the center position of the left eye image and the center position of the right eye image according to the pupil distance information in conjunction with a preset pupil distance-lens-screen distance matching relationship; and calculating the offset value of the center position of the left eye image according to the center position of the left eye image and a standard center position of the left eye image corresponding to a standard pupil distance, and calculating the offset value of the center position of the right eye image according to the center position of the right eye image and a standard center position of the right eye image corresponding to the standard pupil distance.

* * * * *